April 7, 1931.  P. J. MARKS  1,800,025
CAMERA
Filed Aug. 20, 1928  2 Sheets-Sheet 1
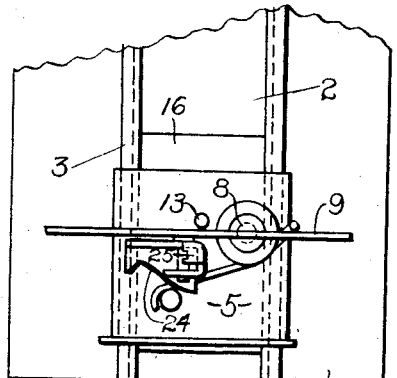
Fig.3
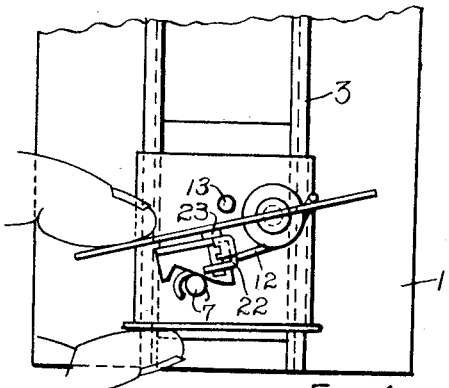
Fig.4
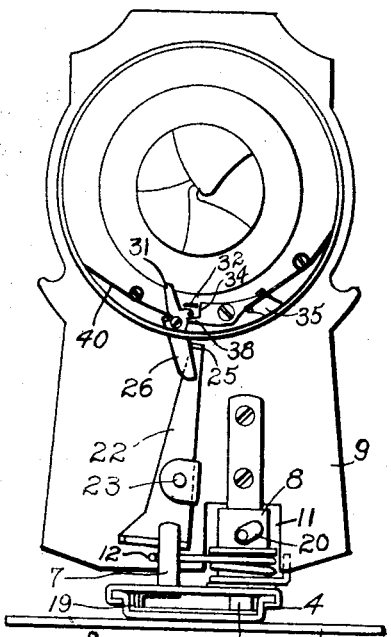
Fig.1
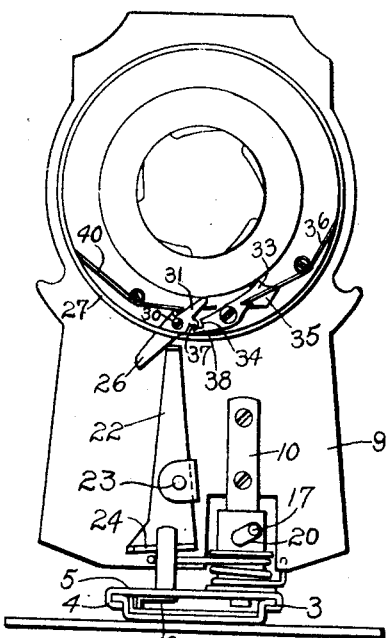
Fig.2
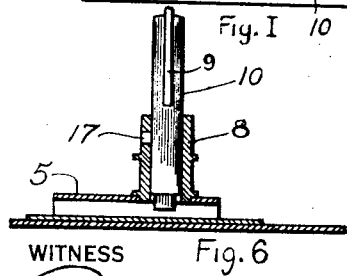
WITNESS  Fig.6
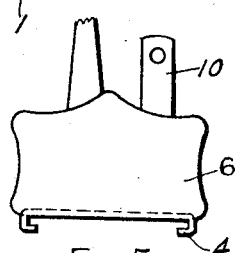
Fig.5
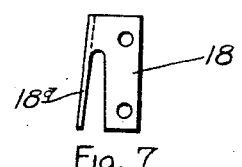
Fig.7
INVENTOR
Paul J. Marks
BY
Nelson A. Hallauer
his ATTORNEY April 7, 1931.  P. J. MARKS  1,800,025
CAMERA
Filed Aug. 20, 1928  2 Sheets-Sheet 2

WITNESS
INVENTOR
Paul J. Marks
BY
Nelson A. Hallauer
his ATTORNEY

Patented Apr. 7, 1931

1,800,025

UNITED STATES PATENT OFFICE

PAUL J. MARKS, OF ROCHESTER, NEW YORK

CAMERA

Application filed August 20, 1928. Serial No. 300,823.

This invention relates to cameras, more particularly to the type of camera illustrated and described in my former application for patent, Serial Number 737,465 filed September 13, 1924, for Cameras. In said camera, the lens with its supporting mechanism is moved to incline its axis to its normal focal plane while it is being adjusted to secure a sharp focus on the ground glass or other surface in the focal plane. The principal object of my present invention is to provide a simple and convenient means for releasing the front or lens support from its guideway when the lens is moved to focusing position. A further object of my invention is to provide means for automatically releasing the lens support from its guideway when the lens is moved to focusing position. Another object of my invention is to provide means for automatically moving the shutter blades to open position when the lens is moved to focusing position.

To these and other ends my invention relates to certain improvements, combinations and arrangement of parts, hereinafter more fully described and particularly pointed out in the claims at the end of this specification.

In the drawings:

Figure 1 is a front elevation of a front or lens board of a camera constructed according to one embodiment of my invention, the parts being shown in normal position, the finger rest being sectioned away for clearness.

Figure 2 is a similar view showing the parts in another position.

Figure 3 is a plain view of the same, the lens and shutter being removed to more clearly expose the guideway, the parts being in the normal position shown in Figure 1.

Figure 4 is a plan view similar to Figure 3 but showing the parts in the Figure 2 position.

Figure 5 is a front elevation showing the finger rest in detail.

Figure 6 is a sectional detail view of the locking devices.

Figure 7 is a plan view of a friction device for retarding the movements of the lens board.

Similar reference numerals refer to the same parts in all the figures of the drawings.

Figure 8:
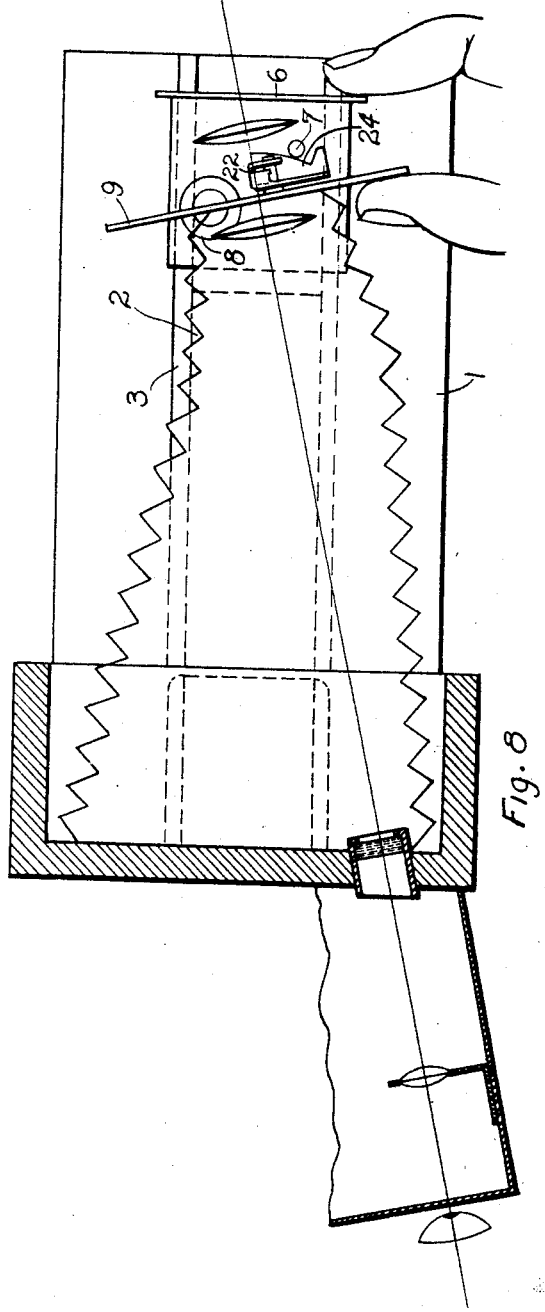
Figure 8 is a sectional plan view showing the lens board in focus adjusting position.

Referring to the drawings, 1 is a supporting member or bed for the front end of the camera to which it may be hinged to form a closure when the camera is not in use. Secured to the supporting member 1 by any suitable means, is a guideway or track 2, having raised laterally projecting flanges 3, adapted to co-operate with inwardly projecting flanges 4, on the bottom of base 5 of the carriage or lens board in which the shutter and lens are mounted. At its forward end the base 5 is provided with an upwardly extending flange 6 forming a finger rest clearly shown in Figure 5, and to the rear of this flange is a post 7 fixed to and projecting from the base 5, the purpose of which will be presently described. Also mounted on the base 5 of the carriage and spaced from the post 7 is a sleeve 8 in which the front or lens board 9 is pivotally supported on a post or bearing member 10 to which it is secured by means of screws or otherwise. The board 9 is cut away at 11, as clearly shown in the drawings to provide a clearance for the sleeve 8. A spring 12 is coiled about the sleeve 8 and anchored on the post 7 and engages the board 9 to maintain it resiliently in the normal or Figure 1 position in contact with a lug or stop 13 fixed to the base 5, when the members 6 and 9 are gripped between the fingers as shown in Figure 8 the lens board may be turned on its pivot against the tension of the spring 12 from the position shown in Figure 3 to that shown in Figures 4 and 8 and is automatically returned by the action of the spring when released. Means are provided for retaining the carriage in adjusted position on its guideway when the member 9 is in normal position. Said means being automatically released when the lens board swings on its pivot. To this end the pivot or bearing member 10 projects through an opening in the base 5 and is adapted to co-operate with the guideway 2 or a locking member 16 secured to the guideway or formed integral therewith. The means for operating the member 10 comprises a lug or a stud 17 on the member 10 projecting laterally through an inclined cam slot 20. Thus, it will be readily seen that when the lens board is in the normal position shown in Figure 1, the lug 17 occupies the lower left hand end of the slot 20 and the member 10 is projected into engagement with the locking member 16, when the lens is moved to the focusing position shown in Figure 2, the pivot 10 turns to the right, and moves the lug 17 along the cam slot 20 to raise the parts to the Figure 2 position with the member 10 out of engagement with the guideway. It will be noted that when the parts are in the Figure 2 position, the carriage is free to be moved along its guideway, but when the parts are in the Figure 1 position, the locking member 10 engages the member 16 and frictionally holds the carriage in its adjusted position. The locking member 16 may be made shorter than the guideway, and to occupy the forward end thereof where fine adjustments are made in focusing, as shown in Figures 3 and 4, so that the carriage may move freely over the rear end of the guideway to and from the camera frame.

In order to prevent the lens board from accidentally slipping out of the adjusted focusing position, I have provided a friction shoe or brake 18 shown in detail in Figure 7, and secured to the under side of the member 5 by any suitable means as by screws. The member 18 has a spring finger 18a projecting laterally therefrom into engagement with one of the sides of the guideway or a co-operating friction member 19 formed as a lateral vertical flange on the locking member 16.

I have also provided novel means for opening the shutter or retracting the shutter blades when the lens is moved to focusing position, thus eliminating the necessity of setting the shutter to "Time" during the focusing operation. To this end a lever 22, is pivoted at 23 to the front board 9. At its lower end, the lever is provided with a cam 24, arranged to engage the member 7 fixed to the carriage. The lever 22 extends upwardly from its pivot to a point adjacent the shutter and at its upper end is provided with a finger or lug 25, adapted to co-operate with a lever 26 pivoted in the shutter and in the present instance projects through a slot in the shutter casing 27 and into the path of the lever 22 or the lug 25 thereon. The lever 26 is pivoted at 30 and provided with an arm 31 adapted to engage a lug 32 on the blade actuating member of the shutter to retract the blades or open the shutter as shown in Figure 2. Some shutters are provided with a locking device to prevent accidental rebound of the blades which might result in a fogging double exposure of the sensitive film. The shutter shown in the present instance is provided with such a locking device. Said device comprises a member 33 pivoted in the shutter casing and having a shouldered portion 34 normally adapted to project into the path of the lug 32 when the blades are in closed position, and at its opposite end is provided with a portion 35 which normally engages the inner wall of the shutter casing as shown in Figure 1. A spring 36 is anchored in the shutter casing and engages the locking member 33 to resiliently hold it in its locking position. A cam or projection 37 provided on the lever 26 is adapted to engage the locking member 33 or a projection 38 provided thereon and turn it against the action of its spring out of the path of the member 32 to permit the shutter blades to move freely to open position. It will be understood that when the lens board is moved to focusing position, movement of the lever 22 turns the lever 26, to automatically unlock and move the blades to open position and holds them in such a position until the lens returns to normal position, when they automatically return to closed position. By this arrangement it is unnecessary to set the shutter on time while adjusting the lens to focusing position. Ordinarily the action of the spring 36 and the blade actuating member are sufficient to return the lever 26 to normal position, however in some cases this action may be too sluggish, in which case I have provided the spring 40 to engage and resiliently maintain the lever 26 in its normal position shown in Figure 1.

Having described my invention what I claim and desire to secure by Letters Patent is:

1. In a camera, the combination of a frame, a bed, a carriage slidably movable on the bed, a lens board movable on the carriage, means for locking the carriage to the bed when the lens board is in normal position, and means for automatically releasing said locking means when the lens board is moved from normal position.

2. In a camera, the combination of a frame, a bed, a carriage slidably movable on the bed, a lens board pivoted on said carriage, means for locking the carriage to the bed when the lens board is in normal position, a spring for maintaining the lens board in normal position, and means for releasing said locking means when the lens board is moved against the action of its spring.

3. In a camera, the combination of a frame, a bed, a carriage slidably movable on the bed, a lens board pivoted on the carriage, a lock associated with the pivot of the lens board and adapted to lock the carriage to the bed when the lens board is in normal position, and means for automatically releasing said lock when the lens board is turned on its pivot.

4. In a camera, the combination of a frame, a bed, a carriage slidably movable on the bed, a lens board pivoted on the carriage, means associated with the pivot of the lens board and movable into engagement with the bed for locking the carriage in adjusted position thereon, and means for moving said locking means out of and into engagement with the bed when the lens board is moved on its pivot.

5. In a camera, the combination of a frame, a bed, a guideway on said bed a carriage slidable on the guideway, a lens board movably mounted on the carriage, a locking member on the guideway, a co-operating locking member on the carriage, means for automatically releasing said locking means when the lens board is moved in one direction on its carriage and resilient means for moving the lens board in the other direction and reengaging the locking means.

6. In a camera, the combination of a frame, a bed, a guideway on said bed, a carriage slidable on the guideway, a lens board mounted on the carriage, means for locking the carriage to the guideway and means for retaining the carriage in adjusted position when the locking means is released.

7. In a camera, the combination of a frame, a bed, a carriage slidably mounted on said bed, a lens board movable on the carriage, a shutter mounted in the lens board, and means for automatically opening the shutter when the lens board is moved on the carriage.

8. In a camera, the combination of a frame, a bed, a carriage slidably mounted on said bed, a lens board movable on the carriage, a shutter mounted in the lens board, a lever for opening the shutter, and means on the lens board for automatically actuating said lever when the lens board is moved on the carriage.

9. In a camera, the combination of a frame, a bed, a carriage slidably mounted on said bed, a lens board movable on the carriage, a shutter mounted in the lens board, means for opening the shutter, a lever on the lens board for actuating said means, and means for automatically operating said lever when the lens board is moved on the carriage.

10. In a camera, the combination of a frame, a bed, a carriage slidably mounted on said bed, a lens board movable on the carriage, a shutter mounted in the lens board, means for opening the shutter, a lever on the lens board for actuating said means, and a fixed member on the carriage for operating said lever when the lens board is moved on the carriage.

11. In a camera, the combination of a frame, a bed, a carriage slidably mounted on said bed, a lens board movable on the carriage, a shutter mounted in the lens board, means for opening the shutter, a lever on the lens board for actuating said means, a fixed member on the carriage and a cam on the lever engaging the fixed member and adapted to actuate the lever when the lens board is moved on the carriage.

12. In a camera, the combination of a frame, a bed, a carriage movable on the bed, a lens board movable on the carriage, a lock normally locking the carriage to the bed, a shutter in the lens board, and devices for simultaneously releasing the lock and opening the shutter when the lens board is moved on the carriage.

13. In a camera, the combination of a frame, a bed, a carriage slidable on the bed, a lens board pivoted on the carriage, stops for limiting the movement of the lens board in both directions, and means for resiliently maintaining the lens board at the limit of its movement in one direction.

14. In a camera, the combination of a frame, a bed, a guideway on the bed, a carriage slidable on the guideway, a lens board pivoted on the carriage to swing to and from normal position, means for locking the carriage on the guideway when the lens board is in normal position, and means on the carriage frictionally engaging the guideway for maintaining the carriage in adjusted position when the lens board is moved from normal position.

15. In a camera, the combination of a frame, a bed, a carriage slidable on the bed, a sleeve on the carriage, a post revoluble in said sleeve and movable axially into engagement with the bed to lock the carriage thereto, a lens board on said post, and means for moving the post out of engagement with the bed when the post is turned.

16. In a camera, the combination of a frame, a bed, a carriage movable on the bed, a lens board pivoted on the carriage, a shutter on the lens board habing blades movable to and from closed position, means for normally maintaining the blades in closed position, and devices actuated by the movement of the lens board for releasing and moving the shutter blades to open position.

17. In a camera, the combination of a frame, a bed, a carriage movable on the bed, a lens board pivoted on the carriage, a shutter on the lens board having blades movable to and from closed position, means for locking the carriage to the bed when the lens board is in normal position, means for moving the shutter blades to open the shutter when the lens board is moved from normal position, and devices for automatically releasing said locking means when the lens board is moved to open the shutter.

PAUL J. MARKS.